United States Patent Office 3,402,098
Patented Sept. 17, 1968

3,402,098
ADHERENDS BONDED TOGETHER BY AN INTERPOLYMER OF ETHYLENE AND A VINYL AMIDE
Bernard O. Baum, Plainfield, Richard K. Walton, North Plainfield, and Royal E. Reynolds, Somerset, N.J., assignors to Union Carbide Corporation, a corporation of New York
No Drawing. Continuation-in-part of application Ser. No. 129,562, Aug. 7, 1961. This application June 19, 1962, Ser. No. 203,478
19 Claims. (Cl. 161—190)

This application is a continuation-in-part of application, Ser. No. 129,562 filed on Aug. 7, 1961 and now abandoned.

This invention relates to novel adhesive materials which are suitable for use as coatings, adhesives, and laminating agents. More particularly, this invention relates to laminates comprising an adherend and bonded thereto at least one layer of an interpolymer of ethylene and a vinyl amide.

A common expedient for the adaptation of materials to new uses and new environments is to form a composite of two or more materials, whereby the desirable properties of each of the materials are utilized and the effect of the undesirable properties is minimized. For example, inexpensive and strong materials having unattractive appearances are often coated with more beautiful and costlier materials; protective coatings are provided for materials having desirable strength characteristics but which tend to deteriorate on exposure to a particular environment; materials incapable of utilization in structural applications are bonded to other materials to form a multi-ply material having the desired strength; etc.

In each of these above-related methods, it is necessary to form an adequate bond between each of the materials used. In the past this has been accomplished through the use of synthetic resins such as phenolic or epoxy resins as the adhesive material. Although the thermosetting resins are capable of forming bonds of good strength to many different materials and have good resistance to creep under protracted stresses, they have many undesirable characteristics. For example, they are generally expensive and are inconvenient to handle because of short shelf lives, the necessity for multi-component systems, and the like. In addition, they are generally rigid, brittle and inelastic, and thus, are unsuitable for many applications. Nevertheless, these materials were employed because other materials having the good bond strength and creep resistance necessary for many applications were not readily available.

It has been recognized thta thermoplastic resins would have distinct advantages over the thermosetting materials. For example, processing advantages would include ease of shaping and application, the elimination of multi-component systems, practically unlimited shelf life, elimination of the necessity of costly curing cycles, and elimination of the necessity of volatiles which often mar the finished bond. Moreover, thermoplastics readily form self-sustaining films. Finally, improvements would be achieved in the finished product, because thermoplastics characteristically are less brittle, more flexible, and more easily colored than the thermosetting materials, and can be re-softened to rectify assembly errors.

However, many of the thermoplastics, although having adhesive properties, have poor resistance to creep and are therefore unsuitable for many applications.

It has been discovered by this invention that superior laminoles are secured by having bonded to at least one surface of an adherend, a layer of thermoplastic interpolymer of ethylene and certain vinyl amides. Such interpolymers produce superior laminates because they exhibit good adhesive properties to a wide variety of materials and have superior resistance to creep. Moreover, these copolymers are capable of being formed into nontacky films which can then be applied to the selected surfaces by heat and pressure. Because the ethylene/vinyl amide copolymers can be employed as a film, the following advantages over the thermosetting resins result:

(a) a single component system is obtained which needs no mixing to form the adhesive;
(b) unlimited shelf life;
(c) no liquids to be handled;
(d) no volatiles;
(e) no priming of the substrate necessary;
(f) elimination of curing cycles;
(g) strong bonds are obtained;
(h) readily controllable glue line thickness;
(i) freedom of the adhesive layer from pinholes;
(j) ultra thin laminates are feasible;
(k) lower cost because less material is necessary;
(l) elimination of supporting webs for film adhesives;
(m) reproducible bonding effects, elimination of variations due to cure cycles or aging of the resin.

The thermoplastic adhesives employed in this invention are interpolymers of ethylene and vinyl amides of the formula:

(I) 

wherein R is either vinyl or an alkyl group of from 1 to 4 carbon atoms; when R is vinyl, $R^1$ and $R^2$ can be hydrogen or a hydrocarbon radical free of aliphatic unsaturation having from 1 to about 6 carbon atoms; and when R is alkyl, $R^1$ is a hydrocarbon radical free of aliphatic unsaturation having from 1 to about 6 carbon atoms and $R^2$ is vinyl. Thus, the vinyl amides contain only one vinyl group. Other than this group, no other polymerizable aliphatic unsaturation should exist on the vinyl amide. Thus, the hydrocarbon substituents can be alkyl radicals of from 1 to 6 carbon atoms, such as methyl, ethyl, propyl, isopropyl, butyl, hexyl and the like; phenyl; and cyclo-aliphatic radicals of from 5 to 6 carbon atoms such as cyclopentyl and cyclohexyl. Thus, the term "vinyl amide," as employed in the specification and claims includes both acrylamides and N-vinyl alkanoic acid amides.

As examples of these vinyl amides one can mention acrylamide, N-methyl acrylamide, N-hexyl acrylamide, N-cyclohexyl acrylamide, N-phenyl acrylamide, N,N,-dihexyl acrylamide, N,N-dicyclohexyl acrylamide, N,N-diphenyl acrylamine, N-vinyl acetamide, N-vinyl propionamide, N-vinyl valeramide, N-methyl-N-vinyl acetamide, N-hexyl-N-vinyl acetamide, N-cyclohexyl-N-vinyl acetamide, N-phenyl-N-vinyl acetamide, and the like.

Subgeneric to the compounds represented by the above formula are the N-vinyl alkanoic acid amides (when $R^2$ is the vinyl group) of the formula:

(II) 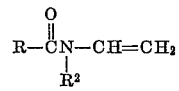

and the acrylamides (when R is the vinyl group) of the formula:

(III) 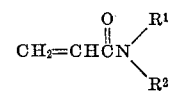

wherein R, $R^1$ and $R^2$ are as described above.

The particularly preferred compounds are the N-substituted-N-vinyl acetamide of the formula:

(IV)
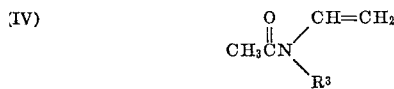

wherein $R^3$ is an alkyl radical of from 1 to about 6 carbon atoms or phenyl, and the acrylamides of the formula:

(V)
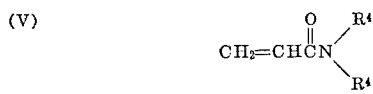

wherein each $R^4$ can be a hydrogen atom, an alkyl radical of from 1 to about 6 carbon atoms, or phenyl. As illustrations of compounds within this preferred class one can mention N-methyl-N-vinyl acetamide, N-ethyl-N-vinyl acetamide, N-propyl-N-vinyl acetamide, N-isopropyl-N-vinyl acetamide, N-butyl-N-vinyl acetamide, N-hexyl-N-vinyl acetamide, N-phenyl-N-vinyl acetamide, acrylamide, N-methyl acrylamide, N-ethyl acrylamide, N-propyl acrylamide, N-isopropyl acrylamide, N-hexyl acrylamide, N-phenyl acrylamide, N,N-dimethyl acrylamide, N,N-diisopropyl acrylamide, N,N-diphenyl acrylamide, and the like.

The ethylene/vinyl amide copolymers employed in this invention can contain from about 0.5 weight percent to about 50 weight percent, and preferably from 5 weight percent to 30 weight percent, polymerized vinyl amide. These copolymers can have melt indices, as measured according to ASTM D1238–57T, of from about 0.01 dgm./min. to about 1000 dgm./min. or higher, with melt indices of from about 1 dgm./min. to about 100 dgm./min. preferred.

The ethylene/vinyl amide copolymers can be produced by any of the known processes, provided they have the above characteristics. One suitable manner of producing them is by the use of free-radical catalysts, employing batch, semi-continuous, or continuous processes, using a stirred autoclave, a tubular reactor, or the like. By the term "free-radical catalyst" is meant a catalyst which forms free radicals under the polymerization conditions employed, and includes oxygen; peroxides, such as hydrogen peroxide, dibenzoyl peroxide, diacetyl peroxide, di-tert.-butyl peroxide, dilauroyl peroxide, perbenzoic acid, peracetic acid, and the like; azo compounds, such as azobisisobutyronitrile, and the like; etc.

In such processes, pressures of from about 900 p.s.i.g. to about 100,000 p.s.i.g. or more can be employed for the polymerization, with pressures of from about 15,000 p.s.i.g. to about 50,000 p.s.i.g. preferred. The polymerization can be conducted at temperatures of from about 40° C. to about 400° C., with temperatures of from about 70° C to about 225° C. preferred. The process can be carried out with or without diluents which may or may not be solvents for either of the monomers or for the resulting copolymers.

The ethylene and the vinyl amide can be added separately, or as a mixture thereof, to the pressure reactor, provided they are in intimate contact with the free-radical catalyst at the polymerization conditions. After completion of the polymerization the polymer is recovered by methods known in the art.

The adhesion of the ethylene/vinyl amide copolymers can be improved by the addition thereto of organic isocyanates whereby a polymer-isocyanate blend is produced. The organic isocyanates which are blended with the ethylene/vinyl amide copolymer can be represented by the formula $Z(NCO)_x$ wherein $x$ is an integer of at least 1; and Z is any polyvalent organic radical having a valence of $x$ and in which the valence bonds are from carbon atoms. Thus, suitable isocyanates can be monoisocyanates, polyisocyanates, and polymers containing a plurality of isocyanate groups. Preferred are polyisocyanates wherein $x$ is at least 2, with polyisocyanates wherein $x$ is 2 or 3 being especially preferred. In general, Z can be a hydrocarbon moiety, such as an aliphatic moiety, an alicyclic moiety, an aromatic moiety, or contain 2 or more of such moieties containing at least 2 and preferably from 2 to about 40 carbon atoms. Z can also include radicals of the formula $+Z'-Y+_n Z'-$ wherein $n$ is an integer having a value of at least 1, preferably from 1 to about 10; Y is a divalent moiety such as

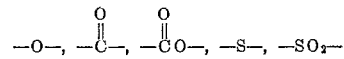

etc.; and $Z'$ is a divalent hydrocarbon moiety having from 2 to about 40 carbon atoms. The hydrocarbon moieties of the organic isocyanates can be substituted with one or more inert groups, such as alkyl, cycloalkyl, aryl, alkoxy, aryloxy, alkanoyl, aroyl, alkanoyloxy, aryoloxy, and the like without interfering with the improved adhesion resulting from the use of the isocyanates.

As examples of suitable isocyanates one can mention isocyanatoethane, isocyanatopropane, isocyanatooctane,
isocyanatooctadecane, isocyanatobenzene,
1-isocyanatonaphthalene, 2-isocyanatonaphthalene,
1,2-diisocyanatoethane, 1,3-diisocyanatopropane,
1,2-diisocyanatopropane, 1,4-diisocyanatobutane,
1,5-diisocyanatopentane, 1,6-diisocyanatohexane,
bis(3-isocyanatopropyl) ether
bis(3-isocyanatopropyl) sulfide, 1,7-diisocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane, 1,10-diisocyanatodecane,
1,6-diisocyanato-3-butoxyhexane,
the bis(3-isocyanatopropyl) ether of 1,4-butylene glycol,
1,11-diisocyanatoundecane, 1,12-diisocyanatododecane,
bis(isocyanatohexyl) sulfide, 1,4-diisocyanatobenzene,
2,4-diisocyanatotoluene, 1,3-diisocyanato-O-xylene,
1,3-diisocyanato-m-xylene, 1,3-diisocyanato-p-xylene,
2,4-diisocyanato-1-chlorobenzene,
2,4-diisocyanato-1-nitrobenzene,
2,5-diisocyanato-1-nitrobenzene
4,6-diisocyanato-1,4-dichlorobenzene,
2,5-diisocyanato-1-chloro-4-methoxybenzene,
2,5-diisocyanato-1-methoxybenzene,
2,4-diisocyanato-1-methoxybenzene,
2,5-diisocyanato-1-methyl-4-methoxybenzene,
2,4-diisocyanato-1-ethylbenzene,
2,4-diisocyanato-1-ethoxybenzene,
4,6-diisocyanato-1,3-dimethoxybenzene,
2,5-diisocyanato-1,4-dimethoxybenzene,
2,4-diisocyanato-1-propylbenzene,
2,4-diisocyanato-1-propoxybenzene,
2,4-diisocyanato-1-isobutylbenzene,
2,4-diisocyanato-1-isobutoxybenzene,
2,5-diisocyanato-1,4-diethoxybenzene,
1,3-diisocyanatocyclohexane,
1,4-diisocyanatocyclohexane,
1,4-diisocyanatonaphthalene,
1,5-diisocyanatonaphthalene,
2,6-diisocyanatonaphthalene,
2,7-diisocyanatonaphthalene,
1-(isocyanatomethyl)-2-(3-isocyanatopropyl)-3,5-dimethoxycyclohexane,
1,3-bis(4-isocyanatophenyl)propane,
α,β-bis(2-isocyanatoethyl)-9,10-endoethylenedihydroanthracene,
2,4-diisocyanato-1-methylcyclohexane,
2,4-diisocyanato-1-ethylcyclohexane,
bis(4-isocyanatocyclohexyl)methane,
1,1-bis(4-isocyanatocyclohexyl)ethane,
2,2-bis(4-isocyanatocyclohexyl)propane,
bis(2-methyl-4-isocyanatohexyl)methane,
bis(3,5-dimethyl-4-isocyanatohexyl)methane,
1-isocyanatomethyl-4-isocyanatobenzene,
1-(2-isocyanatoethyl)-4-isocyanatobenzene,
1-(2-isocyanatoethyl)-3-isocyanatobenzene, 1-(3-isocyanatopropyl)-4-isocyanatobenzene,
1-(4-isocyanatobutyl)-4-isocyanatobenzene,
1,5-diisocyanatotetrahydronaphthalene,
4,4'-diisocyanatoazobenzene,
2-methyl-4,4'-diisocyanatoazobenzene,
4,4'-diisocyanato-1-naphthaleneazobenzene,
2,4-diisocyanatodiphenyl ether, dianisidine diisocyanate,
ethylene glycol bis(4-isocyanatophenyl) ether,
diethylene glycol bis(4-isocyanatophenyl) ether,
2,2'-diisocyanatobiphenyl, 2,4-diisocyanatobiphenyl,
4,4'-diisocyanatobiphenyl,
3,3'-dimethoxy-4,4'-diisocyanatobiphenyl,
3,3'-dimethyl-4,4'-diisocyanatobiphenyl,
2-nitro-4,4'-diisocyanatobiphenyl,
bis(4-isocyanatophenyl)methane,
bis(2-methyl-4-isocyanatophenyl)methane,
2,2-bis(4-isocyanatophenyl)propane,
bis(2,5-dimethyl-4-isocyanatophenyl)methane,
cyclohexyl-bis(4-isocyanatophenyl)methane,
bis(3-methoxy-4-isocyanatophenyl)methane,
bis(4-methoxy-3-isocyanatophenyl)methane,
bis(2-methyl-5-methoxy-4-isocyanatophenyl)methane,
2,2-bis(3-chloro-4-isocyanatophenyl)propane,
3,3'-diisocyanatobenzophenone, 2,4-diisocyanatobibenzyl,
p-nitrophenyl-bis(4-isocyanatophenyl)methane,
phenyl-bis(2,5-dimethyl-4-isocyanatophenyl)methane,
2,7-diisocyanatofluorene,
2,6-diisocyanatophenanthroquinone,
3,6-diisocyanato-9-ethylcarbazole,
3,8-diisocyanatopyrene, 2,8-diisocyanatochrysene,
2,4-diisocyanatodiphenylsulfide,
bis(4-isocyanatophenyl) sulfide,
bis(4-isocyanatophenyl) sulfone,
bis(4-isocyanatobenzyl) sulfone,
2,4'-diisocyanato-4-methyl-diphenyl-sulfone,
4-methyl-3-isocyanatobenzylsulfonyl-4'-isocyanato-
  phenyl ester,
4-methoxy-3-isocyanatobenzylsulfonyl-4'-isocyanato-
  phenyl ester,
bis(2-methyl-4-isocyanatophenyl)disulfide,
bis(3-methyl-4-isocyanatophenyl)disulfide,
bis(4-methyl-3-isocyanatophenyl)disulfide,
bis(4-methoxy-3-isocyanatophenyl)disulfide,
bis(3-methoxy-4-isocyanatophenyl)disulfide,
4-methyl-3-isocyanatobenzylsulfonyl,
4-isocyanato-3-methylanilide,
N,N'-bis(4-isocyanatobenzylsulfonyl)-1,2-diaminoethane,
bis(3-methoxy-4-isocyanatobenzyl)sulfone,
1,2-bis(4-methoxy-3-isocyanatobenzylsulfonyl)ethane,
N,N'-bis(4-methoxy-3-isocyanatobenzyl)-1,2-
  diaminoethane,
2,4,6-triisocyanatotoluene, triisocyanatomesitylene,
1,3,7-triisocyanatonaphthalene,
2,4,4'-triisocyanatodiphenylmethane,
bis(2,5-diisocyanato-4-methylphenyl)methane,
tris(4-isocyanatophenyl)methane,
N,N-bis(4-isocyanatophenyl)carbonyl acid chloride, and the like. Prefered organic polyisocyanates are the diisocyanates, particularly the aromatic diisocyanates wherein the —N=C=O groups are on different ring carbon atoms of the same or different aromatic ring, e.g. 2,4-diisocyanatotoluene and dianisidine diisocyanate (3-methoxy-4-isocyanatobiphenyl).

In general, the amount of polyisocyanate which is employed in the polyisocyanate-ethylene/vinyl amide copolymer blend can vary from about 0.1 or less to about 20 or more weight percent of the polyisocyanate, based on the weight of the resulting composition, with from about 0.5 to about 2 weight percent preferred.

The polyisocyanate is incorporated in the ethylene/vinyl amide copolymer by conventional blending procedures, such as by milling, kneading and the like, or by adding the isocyanate to a solution of the copolymer in an inert organic solvent, such as those mentioned below as being useful in producing the laminates of this invention.

When the isocyanates are blended with the ethylene/acrylamide copolymers containing a hydrogen atom bonded to the nitrogen atom of the polymerized acrylamide monomer, the isocyanate may react with the polymer and, if it is a polyisocyanate, cause the polymer to crosslink. Nevertheless, the resulting composition still has adhesive properties which are superior to those of the copolymer alone. Accordingly, the term "blend," as employed throughout the specification and claims, includes both physical mixtures of isocyanate and ethylene/vinyl amide copolymer and compositions wherein the isocyanate has reacted with the copolymer.

The ethylene/vinyl amide copolymers, whether or not in admixture with polyisocyanates, form strong bonds with virtually any material, including metals such as aluminum, copper, chromium, gold, iron, lead, manganese, nickel, platinum, silver, tin, tungsten, vanadium, and zinc, as well as alloys thereof, such as brasses, bronzes, stainless steels, and the like; cellulosic materials, such as wood, paper, cardboard, cotton cloth, regenerated cellulose, cellulose nitrate, cellulose acetate, cellulose propionate, cellulose acetate-butyrate, and the like; plastics other than the cellulosic derivatives, including thermosetting plastics such as phenolic resins, phenol-aldehyde resins, amino-aldehyde resins, urea-formaldehyde resins, epoxy resins, polyester resins, silicone resins and the like, and thermoplastic polymers, such as polyethylene, polypropylene, acrylate and methacrylates resins, nylon, acrylonitrile resins, vinyl chloride resins, and the like; rubbers, such as natural rubber, GR-S rubber, butyl rubber, neoprene, nitrile rubbers, and the like; ceramic materials, such as chinaware, pottery, porcelain, brick, terra cotta, sewer-pipe, drain tile, fire brick, silica brick, refractory oxides, such as alumina, beryllia, zirconia, or thoria, enamels, glass, and the like; cements, such as portland cement, pozzulona, calcium aluminate cements, as well as special cements such as furane cements, phenolic cements, sulfur cements, silicate cements, and the like; other masonry products, such as stone, including marble, granite, slate, or sandstone, as well as cinder block, and the like, etc. Accordingly, as employed herein the term "adherend" includes any solid material to which the ethylene/vinyl amide copolymers described above will adhere, including both polar materials and non-polar materials. The adherend may be in the form of a planar sheet or may be shaped, such as a rod, cylinder, bottle or in some other configuration, as well as being a filament or fiber, either alone or in the form of yarn, rope, and the like, or woven into cloth, etc.

The ethylene/vinyl amide copolymer can be applied to the adherend or substrate by any method known to those skilled in the art, so long as the copolymer is brought into intimate contact with the adherend. These methods include application of a solution of the copolymer to the adherend and evaporating the solvent whereby a thin coating of the copolymer on the adherend is obtained, melting the copolymer while in contact wtih the adherend, as by the use of heat and pressure, fluidized beds, and the like, etc.

Where the solvent method is employed the copolymer is dissolved in an inert organic solvent, the resulting solution applied to the adherend, and the solvent evaporated off whereby a thin coating of the ethylene/vinyl amide copolymer is formed on the adherend. Applicable solvents are those aliphatic and aromatic hydrocarbons and their halogenated derivatives in which polyethylene is soluble at elevated temperatures. As examples of such solvents one can mention aliphatic compounds such as hexane, heptane, octane, and the like; cycloaliphatic compounds, such as methylcyclohexane, cyclohexane, Decalin, and the like; aromatic compounds, such as benzene, toluene, xylene, tetralin, styrene, and the like; carbonyl-containing compounds, such as amyl acetate, cyclohexanone, and the like; halogenated hydrocarbons, such as tetrachloroethylene, 1,1,2-trichloroethylene, carbon tetrachloride, hexachloropropane, trichlorocumene, tetrachloroethane, hexachlorobutadiene, 1,1,2-trichloroethane, 1,2-dichloroethane, and the like; petroleum fractions, such as petroleum ether, lubricating oil, solvent naphtha, and the like; turpentine; etc.

In general, the ethylene/vinyl amide copolymer is dissolved in the inert organic solvent at temperatures in excess of about 70° C. with temperatures of from about 80° C. to 100° C. preferred.

The solution can have from about 1 weight percent or less to about 30 weight percent or more of the copolymer and from about 99 percent or more to about 70 percent or less of solvent, with solutions containing from about 5 percent to about 20 percent copolymer and from about 95 percent to about 80 percent solvent being preferred.

The solution can then be applied to the adherend by methods known to one skilled in the art and the solvent evaporated off whereby a firmly adherent coating of ethylene/vinyl amide copolymer on the glass surface is produced. For example, the solution can be applied at a temperature of 80° C. to 100° C. and the solvent evaporated, or the admixture can be cooled to temperatures of less than about 80° C. whereby a gel results which thereafter can be applied to the glass surface and the solvent thereafter evaporated off.

A further method for producing the laminates of this invention when the isocyanate modified polymer is desired as the adhesive interlayer is to form a sheet of the ethylene/vinyl amide copolymer and then apply the selected isocyanate to the surface of the copolymer sheet or the selected adherend. The application can be conducted by applying a solution of the isocyanate to the selected surface and evaporating the solvent whereby a layer of isocyanate is deposited on the surface, or, if the isocyanate is a liquid, applying the isocyanate directly to the selected surface. The ethylene/vinyl amide and the adherend then are placed in contact and subjected to heat and pressure to form the laminate. By operating in this manner a thin layer of the isocyanate-copolymer blend is produced at the interlayer-adherend interface.

The ethylene/vinyl amide copolymers can be employed as acid resistant coatings, as water proofing coatings for cinder blocks and other structural materials, as grease and water proofing materials for paper and/or cloth, as the adhesive interlayer is plywood, and in the production of other multi-ply materials, such as safety glass, and the like.

The last named utility is of particular importance, because the chemical inertness and non-polar nature of the glass makes the bonding of materials to glass difficult. This problem is particularly acute in the production of laminates for use as safety glass where a high degree of adhesion of the plastic interlayer to the glass is important to prevent splintering of the glass and the formation of sharp cutting edges when the glass is broken.

Until this invention, the best material suitable for use as the adhesive interlayer in safety glass was poly(vinyl butyral). However, the use of poly(vinyl butyral) in this regard was not satisfactory in all respects. For example, the poly(vinyl butyral) alone was too rigid to be useful as a safety glass interlayer. Thus, it was necessary to add plasticizers to the poly(vinyl butyral) to provide it with the requisite flexibility. But the plasticized poly(vinyl butyral) is very tacky under normal atmospheric conditions. Thus, to prevent "blocking" or sticking of the plasticized poly(vinyl butyral) sheets together prior to manufacture of the safety glass laminates, it was necessary to emboss the sheets to permit only a minimum of surface contact and to dust the surface with sodium bicarbonate to reduce surface tackiness. The poly(vinyl butyral) sheets then had to be washed and dried prior to fabrication of the safety glass laminate to remove the sodium bicarbonate. Furthermore, on aging of the laminate in hot direct sunlight minor imperfections arose, such as discoloring or yellowing of the film and bubble formation between the adhesive interlayer and the glass surface.

The copolymers of ethylene and vinyl amides are excellent glass adhesives which do not have the above-listed disadvantages. These copolymers are of particular utility as the plastic interlayer in safety glass laminates, for, in addition to improved physical properties and firmer adhesion to glass over poly(vinyl butyral), they permit reduced costs in the production of safety glass. These ethylene/vinyl amide copolymers are inherently flexible without plasticization, and the embossing, dusting, washing, and drying procedures previously employed in the manufacture of safety glass laminates are unnecessary. The resulting glass laminates are superior to those wherein poly(vinyl butyral) is employed as the adhesive interlayer. In addition to superior strength and resistance to glass splintering, the glass laminates of this invention are unexpectedly and surprisingly much more resistant to weathering and bubble formation at the interlayer-glass interface than are glass laminates employing poly(vinyl butyral). Extreme heat or cold has little effect on the laminates of this invention and there is little or no discoloration of the laminates after 1000 hours exposure in an X1A Weatherometer.

The preferred vinyl amides for use as comonomers with ethylene in the adhesive interlayer in the glass laminates are N-alkyl-N-vinyl acetamides, wherein the alkyl radical is methyl or ethyl, because of the superior clarity and adhesion to glass of their copolymers. Although ethylene copolymers with other vinyl amides can be used as glass adhesives, their adhesion to glass is insufficient for use in safety glass laminates. However, when polyisocyanates are blended in with these copolymers the resulting blends are suitable for use in safety glass.

When used as the interlayer for glass laminates, it is preferred that the copolymer contain from about 10 weight percent to about 50 weight percent polymerized vinyl amide, and from about 90 weight percent to about 50 weight percent polymerized ethylene. Copolymers having from about 15 weight percent to about 30 weight percent polymerized vinyl amide and from about 85 weight percent to about 70 weight percent polymerized ethylene are particularly preferred. In general, the copolymers employed as a safety glass interlayer should have melt indices of less than about 100 decigrams per minute as determined according to ASTM D1238–57T. Copolymers having melt indices higher than this have been found to exhibit poor adhesion to glass. Copolymers having melt indices of less than 50 decigrams per minute are preferred, with those having less than 20 dgm./min. being especially preferred.

Copolymers having melt indices in excess of 100 dgm./min., and thus having insufficient adhesion to glass for use in safety glass, can be employed in safety glass if blended with polyisocyanates. By the use of polyisocyanates, copolymers having melt indices of up to 1000 dgm. or more can be modified for use in safety glass.

The amount of polyisocyanate employed in safety glass applications can vary from about 0.5 weight percent to about 10 weight percent, with from about 1 to about 5 weight percent preferred. When amounts greater than 10 weight percent are employed the laminate lacks sufficient clarity to be useful for most applications. The minimum amount of polyisocyanate depends upon the adhesive properties of the ethylene/vinyl amide copolymers. For example, the N-methyl-N-vinyl acetamide and N-ethyl-N-vinyl acetamide copolymers having melt indices of less than about 50 dgm./min. have sufficient adhesion to glass without the use of polyisocyanates for most purposes. But at least about 1 weight percent of polyisocyanate is necessary to make an ethylene/N-methyl-N-vinyl acetamide copolymer having a melt index of 550 dgm./min. suitable for use in safety glass. Moreover, small amounts of polyisocyanates in the low melt index copolymers are desirable for increasing the high temperature adhesion of the copolymer.

Where the ethylene/vinyl amide copolymer is to be employed as the adhesive interlayer for safety glass, it is preferred to form a sheet of the copolymer by conventional procedures, such as calendering, extrusion, or the like, make a glass-copolymer-glass sandwich, and then apply heat and pressure to effect the bonding of the copolymer of the glass. In general, pressures of from about 50 p.s.i.g. to about 20,000 p.s.i.g. are employed, with pressures of from about 100 p.s.i.g. to 5,000 p.s.i.g. preferred. Temperatures of from about 40° C. to about 200° C. generally can be employed, with temperatures of from about 80° C. to about 150° C. being especially preferred.

Because the adhesion of the ethylene/vinyl amide copolymer to glass is a surface phenomenon, neither the thickness of the copolymer layer nor the thickness of the glass is of particular criticality. Where the laminates of this invention are to be employed as automotive safety glass, however, it is preferred that the laminate consist of two glass sheets, each having a thickness of from about 3/16 inch to about 1/4 inch, bonded together by a copolymer film of from about 5 mils to about 20 mils thick.

If desired, various additives, such as dyes, pigments, and tints can be incorporated in the ethylene/vinyl amide copolymer without impairing its adhesion to the various adherands. Furthermore, although plasticizers and the like are ordinarily unnecessary, they may be added if desired.

The following examples are illustrative. The following tests were employed in these examples:
 (1) Melt index—ASTM D1238–57T
 (2) Density—ASTM D1505–57T Example I A stream containing 75 weight percent ethylene, 25 weight percent N-methyl-N-vinyl acetamide, and 15 parts per million di-tert.-butyl peroxide, based upon total comonomer weight, was fed at a pressure of 30,000 p.s.i.g. to a tubular reactor having a jacket temperature of 180° C. A white powder was recovered which was a copolymer of ethylene and N-methyl-N-vinyl acetamide having a polymerized ethylene content of 78 weight percent, a polymerized N-methyl-N-vinyl acetamide content of 22 weight percent, and a melt index of 0.47 decigram per minute. This copolymer was then pressed into a 15-mil non-tacky sheet at a pressure of 5,000 p.s.i.g. and a temperature of 110° C. Employing this sheet, a glass-copolymer-glass sandwich was made, heated to 110° C. and sufficient pressure was applied to eliminate all air bubbles between the copolymer and the glass surfaces.

The sandwich produced as above was clear and colorless and remained so after 500 hours in X1A Weatherometer and two days in an oven at 260° F. No bubbles formed in the copolymer or at the copolymer-glass interface after immersion of the sandwich in boiling water for 6 hours. The sandwich was then cooled to 0° C. and smashed with a hammer. No bare areas on the plastic surface was observed.

Example II

Employing procedures similar to those described in Example I, copolymers of ethylene and N-methyl-N-vinyl acetamide containing 10 weight percent, 22 weight percent, and 44 weight percent polymerized N-methyl-N-vinyl actamide, respectively, were produced and formed into 16-mil sheets. Samples cut from these sheets were formed into glass-copolymer-glass laminates, employing two microscope slides for each laminate, whereby a 16-mil thick film was obtained between the two glass slides. The sheets and the laminates were evaluated according to the following specifications considered necessary for a glass laminate to be useful as safety glass:

(1) The laminate must be clear and colorless.
(2) The glass must not separate from the adhesive interlayer after cooling the laminate to 0° C., placing it on a steel plate, and crushing it with a hammer.
(3) There must be no or only a few bubbles in the plastic or at the plastic-glass interface after immersion of the laminate for 2 hours in boiling water.
(4) The laminate must not be discolored after 500 hours exposure in an X1A Weatherometer.
(5) The laminate must not be discolored and have no or only a few scattered bubbles after 2 days in an air oven at 260° F.

All laminates were clear and colorless. The glass did not separate from the ethylene/N-methyl-N-vinyl acetamide copolymer interlayer after crushing of the laminates. No bubbles formed after immersion of the laminates in boiling water or heating in the oven and no discoloration was observed in the X1A Weatherometer of oven tests.

Example III

Employing the previously described techniques, copolymers of ethylene and N-ethyl-N-vinyl acetamide which contained 15 weight percent and 30 weight percent polymerized N-ethyl-N-vinyl acetamide, respectively, were produced and formed into 16-mil sheets. Samples of each of the copolymers were formed into glass-copolymer-glass laminates consisting of a 16-mil thick film interposed between two glass microscope slides. The sheets and the laminates were then evaluated according to the test procedures outlined in Example II. Both copolymers and the laminates produced therefrom met the safety glass standards set forth in Example II.

Example IV

Employing procedures similar to that described in Example I, a 15-mil sheet was formed from an ethylene/N-methyl-N-vinyl acetamide copolymer having a polymerized ethylene content of 78 weight percent and a polymerized N-methyl-N-vinyl acetamide content of 22 weight per cent and a melt index of 0.47 decigram per minute. Employing samples cut from this sheet, the following tests were conducted:

(1) Tensile impact as determined at −30° C. with a dumbell-shaped specimen 2½ inches and 3/8 inch wide according to Bell Laboratories Tensile Impact Test.
(2) Tear strength, as determined at 23° C. according to ASTM D1004–49T.
(3) Tensile strength as determined at 23° C., 60° C., and 80° C. by stretching a dumbell-shaped specimen 2½ inches long and 3/8 inch wide at the narrowest point in an Instron Tester at a loading rate of 10 inches per minute.

Employing additional samples cut from the sheet prepared as above, several glass-copolymer-glass sandwiches were made according to the procedure described in Example I. The sandwiches were tested as follows:

(4) Impact Test—Groups of glass laminates were maintained at −30° C., 0° C., or +60° C., and smashed with a hammer in a uniform manner to determine the degree of adhesion of the glass to copolymer after impact. The samples were rated as follows:

A=Excellent; no bare spots on the interlayer, the glass could not be separated from the interlayer by hand.
B=Good; no bare spots on the interlayer, and glass splinters and pieces could be separated from the interlayer by hand only with difficulty.
C=Fair; some bare spots on the interlayer, and glass splinters were easily separated from the interlayer by hand.
D=Poor, many large bare spots; little or no adhesion.

(5) Yellowness index=(reflectance at 550 mμ minus reflectance at 430 mμ) divided by reflectance at 550 mμ. Measured after:

(a) 1000 hours in an X1A Weatherometer.
(b) Oven aging at 55° C. for two days.
(6) Immersion for 6 hours in boiling water.

| | Ratings |
|---|---|
| A=excellent | No bubbles. |
| B=good | Few bubbles. |
| C=fair | Several bubbles. |

The results of the above-described tests are set forth in tabular form below, together with the results of equivalent tests conducted on a 15-mil thick sheet of a commercially available sample of poly(vinyl butyral) and on glass laminates made therefrom for purposes of comparison.

COMPARISON OF ETHYLENE/N-METHYL-N-VINYL ACETAMIDE COPOLYMER AND POLY(VINYL BUTYRAL)

| Property Tested | Ethylene/N-methyl-N-vinyl acetamide Copolymer | Plasticized Poly(vinyl butyral) |
|---|---|---|
| Sheet: | | |
| 1. Tensile impact, ft. lbs./cu. in. | 970 | 366 |
| 2. Tear strength, lb./in | 478 | 119 |
| 3. Tensile strength, p.s.i.: | | |
| 23° C | 4,246 | 2,552 |
| 60° C | 987 | 34 |
| 80° C | 605 | 25 |
| Laminate: | | |
| 4. Impact Test: | | |
| −30° C | A | C |
| 0° C | A | B |
| +60° C | B | C |
| 5. Yellowness index: | | |
| Initial | 0.01 | 0.02 |
| X1A Weatherometer | 0.05 | 0.22 |
| Oven | 0.08 | 0.31 |
| 6. Boiling water | A | C |

From the above table it is apparent that the laminates of this invention are considerably superior to laminates employing poly(vinyl butyral) as the adhesive interlayer. The physical properties of the copolymer alone are all superior to those of the poly(vinyl butyral). Furthermore, the copolymer in the laminate showed much greater adhesion to glass over the temperature range of the impact test, had greater resistance to discoloration on aging and did not bubble at high temperature.

Example V

An ethylene/N-methyl-N-vinyl acetamide copolymer containing 25 weight percent polymerized N-methyl-N-vinyl acetamide having a melt index of 500 dgm./min. was blended with 1 weight percent, based upon the weight of copolymer, of tolylene diisocyanate, on a two-roll mill at 110° C., with 10 end passes. The resulting sheet was pressed at 150° C. between two pieces of glass with sufficient pressure to eliminate air bubbles. No bubbles were observed after immersion of the laminate in boiling water. The glass did not separate from the copolymer interlayer after cooling of the laminate to 23° C. and smashing with a hammer. In similar tests conducted on laminates employing the unmodified copolymer as the interlayer, delamination occurred after immersion for ½ hour in boiling water, and splintering and separation of the glass from the copolymer interlayer occurred when the laminate was crushed. Employing similar procedures, the following isocyanates were also tested.

(1) Bitolylene diisocyanate.
(2) Dianisidine diisocyanate.
(3) An adduct of 60 parts by weight of tolylene diisocyanate and 40 parts by weight of polyethylene oxide having a reduced viscosity of 1.4 as determined at 27° C. from a solution of 0.2 gram of the polyethylene oxide in 100 ml. of water.
(4) An adduct of 60 parts by weight of bis(2-isocyanatoethyl)carbonate and 40 parts by weight of polyethylene oxide.
(5) Mondur S; a stabilized polyisocyanate adduct having a specific gravity of 1.26–1.28, 95% solids, and 11.5–13.5% available isocyanate groups, sold by Mobay Chemical Co.
(6) Meta-xylylene diisocyanate.
(7) Polymethylene polyphenyl isocyanate.
(8) Bis(4-isocyanatophenyl)methane.
(9) Bis(3-methyl-4-isocyanatophenyl)methane.

All laminates produced wherein these isocyanates were incorporated in the ethylene/vinyl amide copolymer interlayer were immersed in boiling water for 6 hours without bubbling of the interlayers or delamination of the laminate. No splintering or bare spots were observed after the laminates were cooled to 23° C. and smashed with a hammer.

Example VI

A glass laminate employing an ethylene/N-methyl-N-vinyl acetamide copolymer containing 15 weight percent polymerized N-methyl-N-vinyl acetamide and having a melt index of 136, when evaluated according to the safety glass specifications listed in Example II, passed all tests except 6 and 7; many bubbles being observed in the laminate after 6 hours immersion in boiling water, and many bare spaces being present after the smash test at 0° C. A laminate manufactured from the same copolymer, except that 0.5 weight percent, based on the weight of copolymer, of dianisidine diisocyanate had been admixed with the copolymer as described in Example V, passed all of the safety glass tests.

Example VII

Employing procedures similar to those described in Example V, various amounts of dianiside diisocyanate were blended with an ethylene/N-methyl-N-vinyl acetamide copolymer containing 25 weight percent polymerized N-methyl-N-vinyl acetamide, and having a melt index of 550 dgm./min. Glass laminates produced employing the resulting blends were evaluated by the impact test of Example IV at 60° C. The laminates were also evaluated for visual clarity as follows:

Rating:
1 _____ Excellent; no haze, even for distant objects.
2 _____ Good; slight haze for distant objects.
3 _____ Fair; hazy.
4 _____ Poor; translucent.

The results of these tests are set forth in tabular form below:

| Weight percent isocyanate in blend | Impact Test | Visual Clarity |
|---|---|---|
| 0 | D | 1 |
| 0.125 | C | 1 |
| 0.25 | C–B | 1 |
| 0.50 | B | 1 |
| 1.0 | A | 1 |
| 6 | A | 2 |
| 10 | A | 3 |
| 20 | A | 3–4 |

Example VIII

Several experiments were conducted to determine the adhesion of ethylene/vinyl amide copolymers to metals, plastics, cellulosic products, and masonry products. In each instance, a sandwich was made of two sheets of the adherend, with a 20-mil sheet of the ethylene/vinyl amide copolymer interposed therebetween. The sandwich was then subjected to a pressure of 500 p.s.i. and a temperature of 170° C. for 5 minutes, whereby the two like adherands were bonded together through the adhesive interlayer. Each of the resulting laminates was tested for bond strength by immersion in boiling water for one hour and then attempting to separate the adherands by hand. The bonds were evaluated as follows:

(1) Excellent; could not be separated by hand.
(3) Good; could be separated by hand only with difficulty.

(5) Fair; separation by hand with only slight force.
(7) Poor; readily separated by hand or delaminated during boiling.

Even numbers are employed to designate intermediate degrees of adhesion.

The results of each of these tests are set forth in the following tables. The films employed are designated as follows:

(A) Ethylene/N-methyl-N-vinyl acetamide having 22.9 weight percent polymerized N-methyl-N-vinyl acetamide; and having a melt index of 0.47 dgm./min. and a density of 0.944 gm./cc.

(B) Ethylene/acrylamide copolymer having 7 weight percent polymerized acrylamide; and having a melt index of 0.33 dgm./min.

The following films were also tested for purposes of comparison with the ethylene/vinyl amide films:

(C) Polyethylene, having a melt index of 2.0 dgm./min. and a density of 0.916 gm./cc.

(D) Ethylene/ethyl acrylate copolymer having 15 weight percent polymerized ethyl acrylate; and having a melt index of 5 dgm./min. and a density of 0.935 gm./cc.

(E) Ethylene/vinyl acetate copolymer having 10 weight percent polymerized vinyl acetate; and having a melt index of 3.4 dgm./min.

METALS

| Metal | Film |||||
|---|---|---|---|---|---|
| | A | B | C | D | E |
| Cold Rolled Steel (20-mil) | 1 | 1 | 7 | 4 | 6 |
| Iron (20-mil) | 3 | 1 | 7 | 4 | 5 |
| Aluminum (3-mil) | 3 | 1 | 7 | 5 | 6 |
| Tin (20-mil) | 3 | 1 | 7 | 5 | 5 |
| Brass (20-mil) | 3 | 1 | 7 | 5 | 6 |
| Copper (20-mil) | 3 | 1 | 7 | 5 | 6 |

CELLULOSICS

| Cellulosic Material | Film |||||
|---|---|---|---|---|---|
| | A | B | C | D | E |
| Kraft paper | 1 | 3 | 7 | 6 | 6 |
| Cardboard | 1 | 3 | 7 | 6 | 6 |
| Birch veneer | 1 | 3 | 7 | 6 | 5 |
| Viscose rayon cloth | 1 | 3 | 5 | 5 | 5 |
| Acetate rayon cloth | 1 | 3 | 5 | 5 | 5 |
| Canvas | 1 | 3 | 5 | 4 | 4 |
| Cellophane (regenerated cellulose) | 1 | 3 | 7 | 6 | 6 |
| Paper-coated gypsum board | 1 | 3 | 7 | 5 | 5 |
| Particle board (wood waste bonded with urea adhesive) | 1 | 3 | 5 | 5 | 5 |

PLASTICS

| Plastic | Film |||||
|---|---|---|---|---|---|
| | A | B | C | D | E |
| Poly(vinylidene chloride); 2-mil film | 1 | 7 | 7 | 7 | 7 |
| Poly(acrylonitrile); 20-mil cloth | 3 | 1 | 7 | 7 | 7 |
| Poly(ethylene terephthalate); 5-mil film | 4 | 4 | 7 | 7 | 7 |
| Poly(vinyl alcohol); 20-mil sheet | 1 | 1 | 7 | 5 | 5 |
| Poly(vinyl fluoride); 1-mil film | 4 | | 7 | 7 | 7 |
| Poly(hydroxy ether) (Reaction product of equimolar amounts of 2,2-bis(4-hydroxyphenyl)propane and epichlorohydrin); 20-mil sheet | 1 | 1 | 7 | 7 | 7 |
| 30/70 Methyl methacrylate/styrene copolymer; 20-mil sheet | 4 | | 7 | 7 | 7 |
| 88/12 blend of polystyrene and butadiene/styrene rubber; 20-mil sheet | 1 | | 7 | 5 | 5 |
| 88/15 Vinyl chloride/vinyl acetate copolymer; 20-mil sheet | 1 | 7 | 7 | 7 | 7 |
| Poly(vinyl butyral); 10-mil sheet | 1 | 5 | 7 | 5 | 3 |
| Nylon 66; 20-mil sheet | 4 | | 7 | 6 | 6 |
| Epoxy resin (Reaction product of 90 pbw. diglycidyl ether of 2,2-bis-(4-hydroxyphenyl)propane and 10 pbw. diethylenetetramine); 1-mil coating | 1 | | 1 | 5 | 5 |

STONE AND MASONRY PRODUCTS

| Adherand | Film |||||
|---|---|---|---|---|---|
| | A | B | C | D | E |
| Marble | 3 | | 7 | 6 | 6 |
| Clay brick | 3 | | 7 | 6 | 6 |
| Portland Cement block | 3 | 3 | 7 | 6 | 6 |
| Stone (gravel) [1] | 3 | | 7 | 6 | 6 |
| Cinder block (cement and coal cinders) | 3 | 3 | 5 | 5 | 5 |
| Unglazed Ceramic tile | 3 | 3 | 7 | 6 | 6 |

[1] A sheet of the polymer was heated on a hot plate, gravel was imbedded in the softened polymer, and the resulting composite was tested as described above.

Example IX

Several experiments were conducted to determine the suitability of various ethylene/N-substituted-N-vinyl acetamide copolymers as adhesive films. The amide and its weight percent in the copolymer, as well as the melt index and density of the copolymers employed are tabulated below:

| Amide Comonomer | Weight percent in copolymer | Melt Index, dgm./min. | Density, gm./cc. |
|---|---|---|---|
| N-methyl-N-vinyl acetamide | 10 | 1.8 | 0.937 |
| Do | 22.9 | 0.47 | 0.944 |
| Do | 22.9 | 20 | |
| Do | 25 | 557 | |
| Do | 44 | 9.2 | 0.970 |
| N-ethyl-N-vinyl acetamide | 15 | 0.26 | 0.950 |
| N-phenyl-N-vinyl acetamide | 18 | 3.4 | 0.947 |

For purposes of comparison, the following polymers were also tested.

(1) Polyethylene—melt index of 1.2 dgm./min., density of 0.92 gm./cc.

(2) Ethylene/vinyl acetate copolymer containing 10 weight percent polymerized vinyl acetate and having a melt index of 3.4 dgm./min.

(3) Ethylene/ethyl acrylate copolymer containing 15 weight percent polymerized ethyl acrylate and having a melt index of 5 dgm./min. and a density of 0.935 gm./cc.

(A) Employing a 20-mil sheet of each of the above-listed polymers as an adhesive interlayer, 3-mil aluminum foil was bonded to 50# kraft paper to form house shingle stock at 500 p.s.i. and 170° C. for 5 minutes. Each of the resulting laminates was immersed in boiling water. The laminate employing polyethylene as the adhesive interlayer delaminated in the water. The laminates produced with the ethylene/vinyl acetate or ethylene/ethyl acrylate copolymers were easily separated by hand. None of the laminates produced employing the ethylene/N-substituted-N-vinyl acetamide copolymers as the adhesive interlayer could be separated by hand.

(B) A 3-mil film of each of the above-listed polymers was bonded to a 10-mil sheet of a 30/70 methyl methacrylate/styrene copolymer using a pressure of 50 p.s.i., a temperature of 170° C., and a contact time of 5 minutes. The uncoated side of each of the test films was coated with an admixture of 90 parts by weight of the diglycidyl ether of 2,2-bis(4-hydroxyphenyl)propane and 10 parts by weight of diethylene-tetramine and baked at 60° C. for 48 hours to form a 1-mil coating of epoxy resin. Employing additional two-ply laminates, the uncoated surface of the film was coated with a solution of 20 parts by weight of poly(vinylidene chloride) in 80 parts by weight of carbon tetrachloride, and dried at 50° C. for 24 hours to evaporate the solvent, to form a 1-mil coating of poly(vinylidene chloride).

The laminates all are useful as oxygen barriers, having an oxygen permeability of only 5 cc. mil/100 sq. in./24 hours, as determined according to ASTM D1434–58T. The methyl methacrylate/styrene copolymer film has an oxygen permeability of 250–450 cc. mil/100 sq. in./24 hrs.

The laminates were all tested for strength by applying pressure sensitive cellophane tape to the epoxy resin coating and the poly(vinylidene chloride) coating. When the tape was removed, the epoxy and poly(vinylidene chloride) films were stripped from the laminates employing polyethylene, the ethylene/vinyl acetate copolymer, or the ethylene/ethyl acrylate copolymer as the adhesive interlayer. None of the coatings could be stripped from the laminates having an ethylene/N-substituted-N-vinyl acetamide copolymer as the adhesive interlayer.

(C) Employing procedures similar to those described in experiment B, next above, oxygen barrier materials having an oxygen permeability of less than 5 cc. mil/100 sq. in./24 hours were produced, except that 50# kraft paper (oxygen permeability of 250 to 350 cc. mil/

100 sq. in./24 hours) was substituted for the methyl methacrylate/styrene copolymer. Again, none of the films coated on the ethylene/N-substituted-N-vinyl acetamide copolymers could be stripped, although all the films coated on the polyethylene, ethylene/vinyl acetate, or ethylene/ethyl acrylate copolymers were readily stripped.

(D) A 20-mil sheet of each of the test films was pressure bonded to cinder block (cement and coal cinders), employing 500 p.s.i., 170° C., and a 5 minute contact time. Each coated block was immersed in boiling water for 1 hour. The polyethylene coating separated from the cinder block during boiling. Both the ethylene/vinyl acetate copolymer and the ethylene/ethyl acrylate copolymer were easily separated from the cinder block by hand. The coatings of the ethylene/N-substituted-N-vinyl acetamide copolymers tested could not be removed by hand.

Example X

Three laminates of 35-mil, type 302 stainless steel to 30-mil carbon steel were produced, employing as the adhesive interlayer a 1-, 20-, or 100-mil film of a copolymer of ethylene and N-methyl-N-vinyl acetamide containing 16.9 weight percent polymerized N-methyl-N-vinyl acetamide, and having a melt index of 2.4 dgm./min. The laminates were produced by compression molding, employing a pressure of 500 p.s.i., a temperature of 170° C., and a contact time of 5 minutes. Employing similar procedures, laminates were produced employing as adhesive interlayers polyethylene, ethylene/vinyl acetate, and ethylene/ethyl acrylate films described in Example VIII. All laminates were immersed in boiling water for one hour. The laminates produced with the polyethylene, the ethylene/vinyl acetate copolymer, and the ethylene/ethyl acrylate copolymer films all separated in the water, whereas none of the laminates produced with the ethylene/N-methyl-N-vinyl acetamide copolymer films had delaminated.

Example XI

Employing methods and interlayer films similar to those described in Example X, except that a temperature of 280° C. was employed, laminates of a 10-mil polyethylene film to a 2-mil poly(vinyl fluoride) film were produced and tested by immersion in boiling water for one hour. The laminates to polyethylene directly and through the ethylene/vinyl acetate and ethylene/ethyl acrylate films all delaminated during boiling, but those produced with the ethylene/N-methyl-N-vinyl acetamide copolymer films remained intact.

Example XII

Employing procedures and the adhesive films described in Example X, canvas to canvas laminates were produced and tested. The laminates produced with the polyethylene, the ethylene/vinyl acetate copolymer and the ethylene/ethyl acrylate copolymer films all separated during boiling, whereas the laminate produced with the ethylene/N-methyl-N-vinyl acetamide copolymer films remained intact after 1 hour immersion in boiling water.

Example XIII

Employing a 3-mil film of the ethylene/N-methyl-N-vinyl acetamide copolymer described in Example X as the adhesive interlayer, 3-mil aluminum foil was compression bonded to 40-mil birch veneer, employing a pressure of 500 p.s.i. and a contact time of 2 minutes. Laminating temperatures of 110, 170, and 280° C. were employed. All laminates were immersed in boiling water. The laminate produced at 110° C. delaminated after 2 hours, but the laminates produced at 170° C. and 280° C. were still intact after 6 hours immersion.

Example XIV

Employing methods and materials similar to those described in Example XIII, except that a second 40-mil sheet of birch veneer was substituted for the aluminum foil and the pressing time was 5 minutes, wood to wood laminates were produced and tested. The laminate produced at 110° C. fell apart within 2 hours after immersion in boiling water, whereas the laminates produced at 170 and 280° C. could not even be pried apart after 6 hours immersion.

Example XV

Employing methods and interlayer films similar to those described in Example XIII, except that pressing times of 5 minutes were employed, laminates of 20-mil polyhydroxyether (the reaction product of equimolar amounts of 2,2-bis(4-hydroxyphenyl)propane and epichlorohydrin) to a 2-mil film of polyethylene having a melt index of 2.0 dgm./min. and a density of 0.916 gm./cc. were produced and tested. The laminate produced at 110° C. had delaminated after ½ hour in boiling water; that produced at 170° C. had delaminated in 2 hours, and that produced at 280° C. was still intact after 6 hours.

Example XVI

A 3-mil film of the ethylene/N-methyl-N-vinyl acetamide film described in Example X was bonded to a portland cement block, employing a pressure of 500 p.s.i., a pressing time of 5 minutes and temperatures of 110° C., 170° C., and 280° C. The coated blocks were immersed in boiling water. The coating produced at 110° C. separated from the block after only 2 hours, whereas the coatings produced at 170° C. and 280° C. were still intact after 6 hours.

Employing similar procedures, coatings of 3-mil films of the polyethylene, the ethylene/vinyl acetate copolymer and the ethylene/ethyl acrylate copolymers were produced and tested. All had separated from the block within 2 hours immersion in boiling water, even those produced at 280° C., with the polyethylene coating separating after only ½ hour.

Example XVII

Employing a 20-mil film of the N-methyl-N-vinyl acetamide copolymer described in Example X, a 10-mil sheet of cold rolled steel was bonded to a 40-mil sheet of birch veneer, employing a pressing temperature of 280° C., a pressing time of 5 minutes, and a pressure of 100, 500, 1000, 5000, or 15000 p.s.i. The laminates were then immersed in boiling water for one hour. The laminate produced at 100 p.s.i. pressure was readily separated by hand, whereas the laminates produced at the higher pressures were separated by hand only with difficulty.

Example XVIII

Employing the methods and test procedures of Example XVII, a 20-mil film of the ethylene/N-methyl-N-vinyl acetamide copolymer described in Example X, was employed to bond a 10-mil film of nylon 66 to a 10-mil film of polyethylene (melt index of 20 dgm./min.; density of 0.916 gm./cc.). The laminate produced at 100 p.s.i. was easily separated by hand after 1 hour immersion in boiling water, but the other laminates could be separated only with difficulty.

Example XIX

Employing the methods and test procedures of Example XVII, a 20-mil film of the ethylene/N-methyl-N-vinyl acetamide copolymer described in Example X was employed to bond a 5-mil sheet of neoprene rubber to 40-mil particle board (wood waste bonded by urea adhesive). The laminate produced at 100 p.s.i. was readily separated by hand after 1 hour immersion in boiling water, whereas the other laminates were separated only by difficulty.

Example XX

A 20-mil film of the ethylene/N-methyl-N-vinyl acetamide copolymer described in Example X, was bonded

17 to a sheet of marble, employing a temperature of 280° C., a pressing time of 5 minutes, and pressures of 100, 500, 1000, 5000, and 15,000 p.s.i. The laminates were immersed in boiling water and tested by attempting to remove the coating by hand. The coating produced at 100 p.s.i. was easily removed, whereas the other coatings could be removed only with difficulty.

Although marble is stained by ethanol and is etched by hydrochloric acid, the coated marble was unaffected by either ethanol or 1-molar hydrochloric acid.

Example XXI

A solution of 20 grams of the ethylene/N-methyl-N-vinyl acetamide copolymer described in Example X in 100 grams of heptane was heated to 80° C. and a 20-mil strip of iron was dipped in the solution. After draining and oven drying at 50° C. for 24 hours, the coated iron was immersed in boiling water for 48 hours. At the end of this time, the iron was unaffected although an uncoated strip of iron had begun to rust and a strip coated with polyethylene in a similar manner had delaminated at the edges.

Example XXII

A 20-mil strip of iron was heated to 150° C. and then dipped for 1 minute in a fluidized bed of 20-mesh particles of the ethylene/N-methyl-N-vinyl acetamide copolymer described in Example X. The strip was then heated for 5 minutes at 170° C. to form an even coating. The iron was unaffected by immersion in boiling water for 48 hours, although a strip coated with polyethylene in a similar manner had started to delaminate.

Example XXIII

A 20-mil sheet of poly(vinyl alcohol) was dipped in the ethylene/N-methyl-N-vinyl acetamide copolymer-heptane solution described in Example XXI, which was maintained at 80° C. After draining and oven drying at 50° C. for 24 hours, the coated poly(vinyl alcohol) was immersed in boiling water for 48 hours. The coated poly(vinyl alcohol) was unaffected although an uncoated sheet of poly(vinyl alcohol) had swollen.

Example XXIV

Cotton cloth was immersed for 30 seconds in the ethylene/N-methyl-N-vinyl acetamide copolymer-heptane solution described in Example XXI, which was maintained at 80° C. After draining, the cloth was redipped and drained two more times, and then dried at 70° C. for 2 hours. The coated cloth and an uncoated cloth were immersed in water at room temperature. The untreated cloth wet and sank, but the treated cloth floated. Both the treated and untreated cloths were removed from the water and crushed by hand. The untreated cloth retained creases, but the treated cloth "sprang back" to a smooth, uncreased cloth.

Example XXV

A 20-mil film of the ethylene/N-methyl-N-vinyl acetamide copolymer described in Example X was compression bonded to 50# kraft paper, employing 500 p.s.i., a temperature of 120° C. and a pressing time of 5 minutes. Employing similar procedures, a second sample of kraft paper was coated with a 20-mil film of polyethylene (melt index of 2.0 dgm./min.; density of 0.916 gm./cc.). Both coated samples and a sample of uncoated kraft paper were tested for grease resistance according to the Joint Army-Navy Spec. for barrier materials, JAN-B-121, amendment 2, Jan. 22, 1953. The uncoated paper had a rating of one hour (the grease penetrated in one hour), the polyethylene-coated paper had a rating of 2 hours, but the ethylene/N-methyl-N-vinyl acetamide copolymer-coated paper had a rating of greater than 24 hours.

18

Example XXVI

A plywood composite was produced from 4 layers of 40-mil birch veneer interspaced with 3 layers of 3-mil films of the ethylene/N-methyl-N-vinyl acetamide described in Example X. The composite was subjected to 500 p.s.i. and 170° C. for 5 minutes. The resulting laminate was immersed in boiling water. Delamination did not occur until 48 hours had elapsed.

A second plywood composite was produced employing procedures and materials similar to those described above, except that the ethylene/N-methyl-N-vinyl acetamide film employed had 1 weight percent tolylene diisocyanate blended therein prior to forming the film. The resulting laminate withstood 2 weeks immersion in boiling water.

From this example it is readily apparent that improved laminates are produced when polyisocyanates are blended in the ethylene/vinyl amide copolymer prior to lamination.

What is claimed is:

1. As an article of manufacture, an adherend and directly bonded thereto an interpolymer of ethylene and a vinyl amide selected from the group consisting of an N-vinyl alkanoic acid amide of the formula:

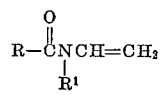

and an acrylamide of the formula:

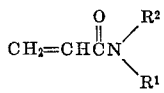

wherein R is an alkyl radical of from 1 to 4 carbon atoms and each $R^1$ and $R^2$, when taken individually, is a member selected from the group consisting of a hydrogen atom and a hydrocarbon radical free of aliphatic unsaturation having from 1 to 6 carbon atoms, said interpolymer containing from 0.5 to 50 weight percent vinyl amide polymerized therein.

2. As an article of manufacture, an adherend and directly bonded thereto a layer comprising a blend of an organic isocyanate and a copolymer of ethylene and a vinyl amide selected from the group consisting of an N-vinyl alkanoic acid amide of the formula:

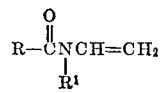

and an acrylamide of the formula:

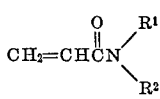

wherein R is an alkyl radical of from 1 to 4 carbon atoms and each $R^1$ and $R^2$, when taken individually, is a member selected from the group consisting of a hydrogen atom and a hydrocarbon radical free of aliphatic unsaturation having from 1 to 6 carbon atoms, said copolymer containing from 0.5 to 50 weight percent vinyl amide, said blend containing up to 20 weight percent of said isocyanate.

3. As an article of manufacture, an adherend and directly bonded thereto an interpolymer of ethylene and a vinyl amide selected from the group consisting of an N-substituted-N-vinyl acetamide of the formula:

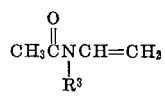

and an acrylamide of the formula:

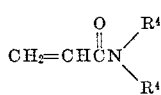

wherein R³ is a member selected from the group consisting of a alkyl of from 1 to 6 carbon atoms and phenyl; and each R⁴ when taken individually, is a member selected from the group consisting of a hydrogen atom, alkyl of from 1 to 6 carbon atoms, and phenyl, said interpolymer containing from 5 to 30 weight percent polymerized vinyl amide.

4. As an article of manufacture, an adherend and directly bonded thereto a copolymer of ethylene and N-methyl-N-vinyl acetamide, said copolymer containing from 5 to 30 weight percent N-methyl-N-vinyl acetamide.

5. As an article of manufacture, an adherend and directly bonded thereto a copolymer of ethylene and N-ethyl-N-vinyl acetamide, said copolymer containing from 5 to 30 weight percent N-ethyl-N-vinyl acetamide.

6. As an article of manufacture, an adherend and directly bonded thereto a copolymer of ethylene and N-phenyl-N-vinyl acetamide, said copolymer containing from 5 to 30 weight percent N-phenyl-N-vinyl acetamide.

7. As an article of manufacture, an adherend and directly bonded thereto a copolymer of ethylene adn acrylamide, said copolymer containing from 5 to 30 weight percent acrylamide.

8. As an article of manufacture, an adherend and directly bonded thereto a layer comprising a blend of an organic isocyanate and an interpolymer of ethylene and a vinyl amide selected from the group consisting of an N-substituted-N-vinyl acetamide of the formula:

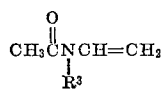

and an acrylamide of the formula:

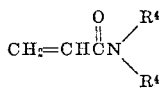

wherein R³ is a member selected from the group consisting of alkyl of from 1 to 6 carbon atoms and phenyl; and each R⁴, when taken individually, is a member selected from the group consisting of a hydrogen atom, alkyl of from 1 to 6 carbon atoms, and phenyl, said interpolymer containing from 5 to 30 weight percent polymerized vinyl amide, said blend containing from 0.5 to 2 weight percent of said isocyanate.

9. As an article of manufacture, an adherend and directly bonded thereto a layer comprising a blend of an organic polyisocyanate and a copolymer of ethylene and N-methyl-N-vinyl acetamide, said copolymer containing from 5 to 30 weight percent polymerized N-methyl-N-vinyl acetamide, said blend containing from 0.5 to 2 weight percent of said polyisocyanate.

10. As an article of manufacture, an adherend and directly bonded thereto a layer comprising a blend of an organic polyisocyanate and a copolymer of ethylene and N-ethyl-N-vinyl acetamide, said copolymer containing from 5 to 30 weight percent polymerized N-ethyl-N-vinyl acetamide, said blend containing from 0.5 to 2 weight percent of said polyisocyanate.

11. As an article of manufacture, an adherend and directly bonded thereto a layer comprising a blend of an organic polyisocyanate and a copolymer of ethylene and N-phenyl-N-vinyl acetamide, said copolymer containing from 5 to 30 weight percent polymerized N-phenyl-N-vinyl acetamide, said blend containing from 0.5 to 2 weight percent of said polyisocyanate.

12. As an article of manufacture, an adherend and directly bonded thereto a layer comprising a blend of an organic polyisocyanate and a copolymer of ethylene and acrylamide, said copolymer containing from 5 to 30 weight percent polymerized acrylamide, said blend containing from 0.5 to 2 weight percent of said polyisocyanate.

13. A glass laminate consisting of a layer of glass and directly bonded thereto, a layer comprising a blend of an organic polyisocyanate and a copolymer of ethylene and a vinyl amide selected from the group consisting of an N-substituted-N-vinyl acetamide of the formula:

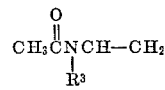

and an acrylamide of the formula:

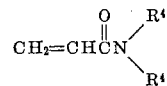

wherein R³ is a member selected from the group consisting of alkyl of from 1 to 6 carbon atoms and phenyl; and each R⁴, when taken individually, is a member selected from the group consisting of a hydrogen atom, alkyl of from 1 to 6 carbon atoms, and phenyl, said copolymer containing from 10 to 50 weight percent polymerized vinyl amide, said blend containing from 0.5 to 10 weight percent of said polyisocyanate.

14. A glass laminate consisting of a layer of glass and directly bonded thereto, a layer comprising a blend of an organic polyisocyanate and a copolymer of ethylene and a vinyl amide selected from the group consisting of an N-substituted-N-vinyl acetamide of the formula:

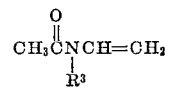

and an acrylamide of the formula:

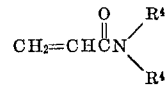

wherein R³ is a member selected from the group consisting of alkyl of from 1 to 6 carbon atoms and phenyl; and each R⁴, when taken individually, is a member selected from the group consisting of a hydrogen atom, alkyl of from 1 to 6 carbon atoms, and phenyl, said copolymer containing from 15 to 30 weight percent polymerized vinyl amide, said blend containing from 1 to 5 weight percent of said polyisocyanate.

15. A glass laminate consisting of a plurality of glass layers and interposed between each pair of said glass layers and directly bonded thereto a copolymer of ethylene and an N-alkyl-N-vinyl acetamide wherein the alkyl group is selected from the group consisting of methyl and ethyl, said copolymer having from 10 to 50 weight percent polymerized N-alkyl-N-vinyl acetamide and a melt index of less than 100 dgm./min.

16. A glass laminate consisting of a plurality of glass layers and interposed between each pair of said glass layers and directly bonded thereto a copolymer of ethylene and an N-alkyl-N-vinyl acetamide wherein the alkyl group is selected from the group consisting of methyl and ethyl, said copolymer having from 15 to 30 weight percent polymerized N-alkyl-N-vinyl acetamide and a melt index of less than 20 dgm./min.

17. A glass laminate consisting of a plurality of glass layers and interposed between each pair of said glass layers and directly bonded thereto, a layer comprising a blend of an organic polyisocyanate and a copolymer of ethylene and an N-alkyl-N-vinyl acetamide wherein the alkyl group is selected from the group consisting of methyl and ethyl, said copolymer containing from 15 to 30 weight percent polymerized N-alkyl-N-vinyl acetamide and having a melt index of less than 20 dgm./min., said blend containing from 1 to 5 weight percent of said polyisocyanate.

18. A laminate consisting of at least one layer of a cellulosic material and directly bonded thereto a layer of an interpolymer of ethylene and a vinyl amide selected from the group consisting of an N-vinyl acetamide of the formula:

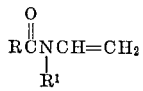

and an acrylamide of the formula:

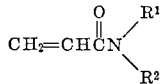

wherein R is an alkyl radical of from 1 to 4 carbon atoms and each $R^1$ and $R^2$, when taken individually, is a member selected from the group consisting of a hydrogen atom and a hydrocarbon radical free of aliphatic unsaturation having from 1 to 6 carbon atoms, said interpolymer containing from 0.5 to 50 weight percent vinyl amide polymerized therein.

19. A plywood laminate consisting of at least one layer of wood and directly bonded thereto a layer of an interpolymer of ethylene and a vinyl amide selected from the group consisting of an N-vinyl acetamide of the formula:

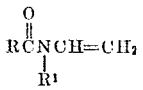

and an acrylamide of the formula:

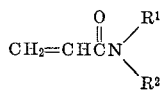

wherein R is an alkyl radical of from 1 to 4 carbon atoms and each $R^1$ and $R^2$, when taken individually, is a member selected from the group consisting of a hydrogen atom and a hydrocarbon radical free of aliphatic unsaturation having from 1 to 6 carbon atoms, said interpolymer containing from 0.5 to 50 weight percent vinyl amide polymerized therein.

References Cited
UNITED STATES PATENTS

| | | | |
|---|---|---|---|
| 2,386,347 | 10/1945 | Roland | 260—87.3 |
| 2,430,479 | 11/1947 | Pratt et al. | 156—331 |
| 2,628,214 | 2/1953 | Pinkney et al. | 260—86.7 |
| 2,920,067 | 1/1960 | Mortimer | 260—88.1 |
| 2,952,578 | 9/1960 | Carlson. | |
| 2,400,139 | 5/1946 | Roland | 161—204 |

OTHER REFERENCES

Delmonte: "The Technology of Adhesives," Reinhold Pub. Co. (New York), 1947, pp. 327–351 relied on.

ROBERT F. BURNETT, *Primary Examiner.*

W. J. VANBALEN, *Assistant Examiner.*